US010404710B2

(12) United States Patent
Self et al.

(10) Patent No.: US 10,404,710 B2
(45) Date of Patent: Sep. 3, 2019

(54) METHODS AND APPARATUSES FOR PROVIDING IMPROVED DIRECTORY SERVICES

(71) Applicant: Change Healthcare Holdings, LLC, Nashville, TN (US)

(72) Inventors: Bryan Self, Birmingham, AL (US); Michael Patterson, Birmingham, AL (US); Vincent Lee, Birmingham, AL (US)

(73) Assignee: CHANGE HEALTHCARE HOLDINGS, LLC, Nashville, TN (US)

(*) Notice: Subject to any disclaimer, the term of this patent is extended or adjusted under 35 U.S.C. 154(b) by 224 days.

(21) Appl. No.: 15/085,259

(22) Filed: Mar. 30, 2016

(65) Prior Publication Data

US 2017/0289166 A1 Oct. 5, 2017

(51) Int. Cl.

*G06F 16/11* (2019.01)
*G06F 16/22* (2019.01)
*H04L 29/06* (2006.01)
*H04L 29/12* (2006.01)

(52) U.S. Cl.

CPC .......... *H04L 63/102* (2013.01); *G06F 16/116* (2019.01); *G06F 16/22* (2019.01); *H04L 67/42* (2013.01); *H04L 61/1523* (2013.01)

(58) Field of Classification Search

USPC .............................................................. 726/6
See application file for complete search history.

(56) References Cited

U.S. PATENT DOCUMENTS

| | | | | |
|---|---|---|---|---|
| 6,366,954 | B1 * | 4/2002 | Traversat | G06F 11/3476 709/220 |
| 6,493,695 | B1 * | 12/2002 | Pickering | H04M 3/5183 706/45 |
| 6,553,405 | B1 * | 4/2003 | Desrochers | G06F 9/44521 709/203 |
| 6,598,057 | B1 * | 7/2003 | Synnestvedt | H04L 29/06 |
| 7,209,970 | B1 * | 4/2007 | Everson | H04L 29/12009 703/4 |
| 7,904,487 | B2 * | 3/2011 | Ghatare | G06F 16/24522 707/803 |
| 8,910,184 | B2 * | 12/2014 | Dixon | G06F 13/00 719/314 |
| 9,940,403 | B2 * | 4/2018 | Chow | H04L 67/2842 |

(Continued)

*Primary Examiner* — Taghi T Arani
*Assistant Examiner* — Badridot Champakesanatusptodotgov
(74) *Attorney, Agent, or Firm* — Alston & Bird LLP

(57) ABSTRACT

A method, apparatus and computer program product are provided for implementing an improved directory services system. An example of the method includes transmitting an access request to a directory services server, the access request comprising user credentials, receiving, in response to validation of the user credentials by the directory services server, a directory services response from the directory services server, the directory services response comprising one or more fields of directory services data generated by the directory services server, translating the directory services response to generate a generic data object, wherein the generic data object comprises one or more values derived from the one or more fields of directory service data included in the directory services response, and providing the generic data object to an application.

19 Claims, 4 Drawing Sheets

(56) References Cited

U.S. PATENT DOCUMENTS

| | | | | |
|---|---|---|---|---|
| 2002/0147857 | A1* | 10/2002 | Sanchez, II | G06F 9/4493 719/316 |
| 2003/0074227 | A1* | 4/2003 | Yu | G06F 19/3418 705/3 |
| 2006/0277220 | A1* | 12/2006 | Patrick | G06F 21/6218 |
| 2006/0282460 | A1* | 12/2006 | Pandya | G06F 9/541 |
| 2009/0037446 | A1* | 2/2009 | Tonev | G06Q 20/201 |
| 2013/0111499 | A1* | 5/2013 | Dixon | G06F 13/00 719/314 |
| 2013/0124667 | A1* | 5/2013 | Chow | H04L 67/2842 709/213 |
| 2013/0318117 | A1* | 11/2013 | Mohamad Abdul | G06F 16/1748 707/769 |
| 2014/0075501 | A1* | 3/2014 | Srinivasan | G06F 21/62 726/1 |
| 2014/0304825 | A1* | 10/2014 | Gianniotis | G06F 21/6254 726/26 |
| 2017/0076740 | A1* | 3/2017 | Feast | G10L 25/63 |
| 2017/0293668 | A1* | 10/2017 | Crabtree | G06F 16/254 |

* cited by examiner

200

METHODS AND APPARATUSES FOR PROVIDING IMPROVED DIRECTORY SERVICES

TECHNOLOGICAL FIELD

Example embodiments of the present invention relate generally to methods, systems, and computer readable storage media for implementing directory services and, more particularly, to methods, systems, and computer readable media for generating data objects from lightweight directory access protocol responses.

BACKGROUND

The Lightweight Directory Access Protocol (LDAP) is an open industry standard for accessing directory information services over Internet Protocol networks. LDAP is often used to provide a centralized repository of login information so as to facilitate access to various applications and services. However, although LDAP is a recognized standard, the implementation of this standard often varies significantly across different networks and systems. In order for applications to interface with LDAP servers, each application must be aware of the particular format, structure, and content of messages for that particular LDAP implementation. Accordingly, a disproportionate amount of time may be spent developing interfaces for communication with LDAP servers, and updating or modifying such an interface typically requires editing of the application code that implements the interface to the LDAP server.

Through applied effort, ingenuity, and innovation, Applicant has solved many of these identified problems by developing a technical solution that is embodied by the present invention, which is described in detail below.

BRIEF SUMMARY

Methods, apparatuses and computer program products are therefore provided according to example embodiments of the present invention in order to provide improved directory access operations through the use of a configurable LDAP translator. The LDAP translator is operable to receive a response from an LDAP server, and generate one or more generic data objects (e.g., Plain Old Java® Objects or “POJOs”) which may be stored or transmitted for use by the application that initiates an access request. By formatting the LDAP response in a generic data object, embodiments obviate the need to understand the entire structure and format of the LDAP response message. Furthermore, the ability of the LDAP translator to be configured (e.g., by one or more configuration files) allows for additions and editing to reflect changes in the LDAP response structure without the need to rebuild or otherwise edit applications making the access request. Such an LDAP translator may also be used in systems that implement two or more LDAP response structures, in the event an application or applications need to communicate with LDAP servers that have different response structures.

An example of an embodiment of a method for implementing improved directory services in a computer network includes transmitting an access request to a directory services server, the access request comprising user credentials, receiving, in response to validation of the user credentials by the directory services server, a directory services response from the directory services server, the directory services response comprising one or more fields of directory services data generated by the directory services server, translating the directory services response to generate a generic data object, wherein the generic data object comprises one or more values derived from the one or more fields of directory service data included in the directory services response, and providing the generic data object to an application.

The application may also generate the access request. The directory services server may be implemented according to the Lightweight Directory Access Protocol (LDAP) standard and the directory services response may be an LDAP response. Translating the directory services response may include receiving one or more configuration files, the one or more configuration files comprising a definition of the generic data object, identifiers for one or more of the fields of directory service data, and one or more rules for formatting the one or more fields of the directory service data for storage in the generic data object, identifying the one or more values derived from the one or more fields of the directory service data based on the identifiers for the one or more fields of directory service data, and formatting the identified one or more values for storage in the generic data object based on the one or more rules. The configuration file may include values encoded in a Yet Another Markup Language (YAML) format. The generic data object may be a Plain Old Java Object. The method may include storing the generic data object in a database. At least one field of the directory services response may not be included in the generic data object.

An example of an embodiment of an apparatus for implementing improved directory services in a computer network includes a processor coupled to a memory. Instructions stored within the memory configure the processor to at least transmit an access request to a directory services server, the access request comprising user credentials, receive, in response to validation of the user credentials by the directory services server, a directory services response from the directory services server, the directory services response comprising one or more fields of directory services data generated by the directory services server, translate the directory services response to generate a generic data object, wherein the generic data object comprises one or more values derived from the one or more fields of directory service data included in the directory services response, and provide the generic data object to an application.

The application may also generate the access request. The directory services server may be implemented according to the Lightweight Directory Access Protocol (LDAP) standard and the directory services response may be an LDAP response. Translating the directory services response may also include receiving one or more configuration files, the one or more configuration files comprising a definition of the generic data object, identifiers for one or more of the fields of directory service data, and one or more rules for formatting the one or more fields of the directory service data for storage in the generic data object, identifying the one or more values derived from the one or more fields of the directory service data based on the identifiers for the one or more fields of directory service data, and formatting the identified one or more values for storage in the generic data object based on the one or more rules. The configuration file includes values encoded in a Yet Another Markup Language (YAML) format. The generic data object may be a Plain Old Java Object. The processor may be further configured to store the generic data object in a database. At least one field of the directory services response may not be included in the generic data object.

An example of an embodiment of a non-transitory computer readable storage medium includes instructions that, when executed by a processor, cause the processor to implement improved directory services in a computer network. The instructions cause the processor to at least transmit an access request to a directory services server, the access request comprising user credentials, receive, in response to validation of the user credentials by the directory services server, a directory services response from the directory services server, the directory services response comprising one or more fields of directory services data generated by the directory services server, translate the directory services response to generate a generic data object, wherein the generic data object comprises one or more values derived from the one or more fields of directory service data included in the directory services response, and provide the generic data object to an application.

The application may also generate the access request. The directory services server may be implemented according to the Lightweight Directory Access Protocol (LDAP) standard and the directory services response may be an LDAP response. The instructions may further configure the processor to translate the directory services response by at least receiving one or more configuration files, the one or more configuration files comprising a definition of the generic data object, identifiers for one or more of the fields of directory service data, and one or more rules for formatting the one or more fields of the directory service data for storage in the generic data object, identifying the one or more values derived from the one or more fields of the directory service data based on the identifiers for the one or more fields of directory service data, and formatting the identified one or more values for storage in the generic data object based on the one or more rules.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
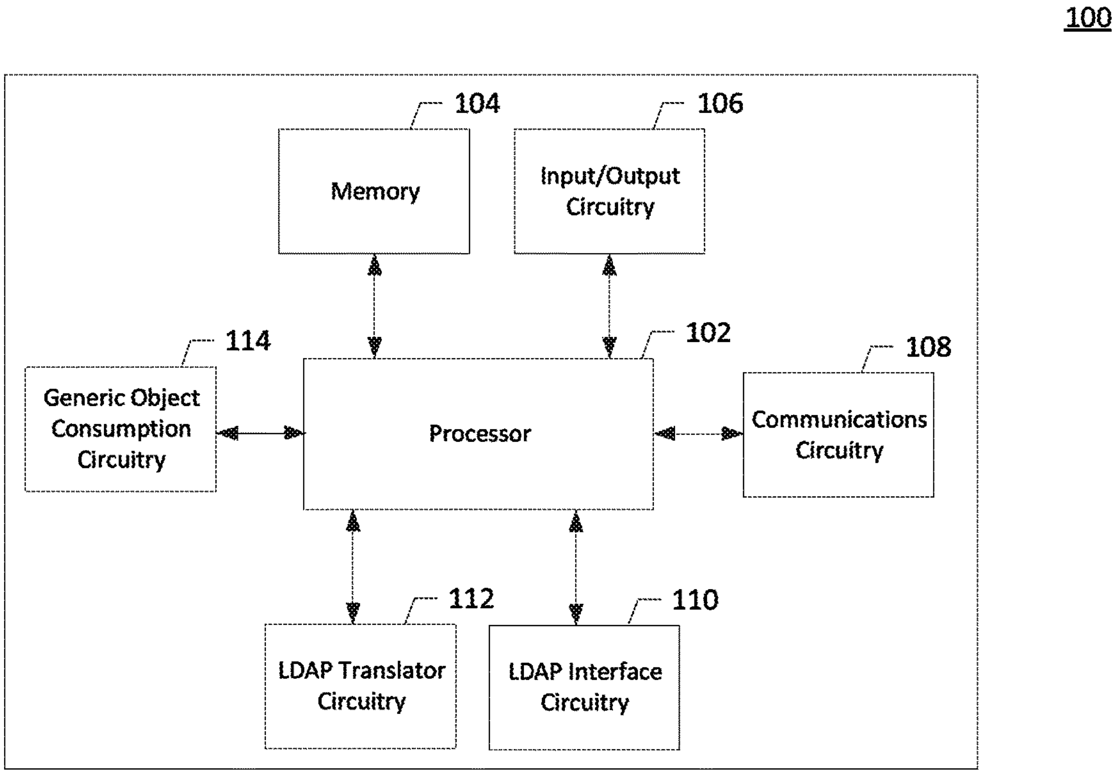
Figure 2:
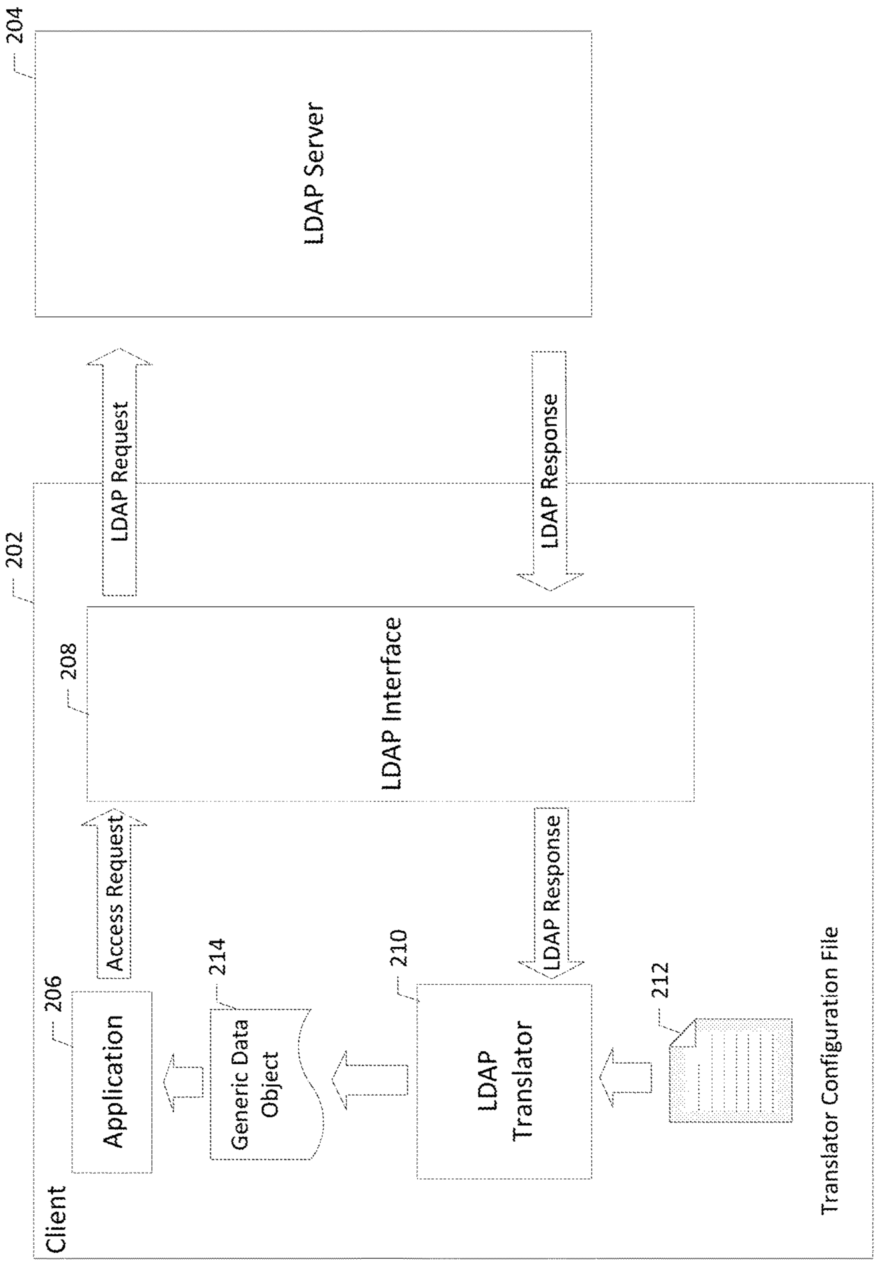
Figure 3:
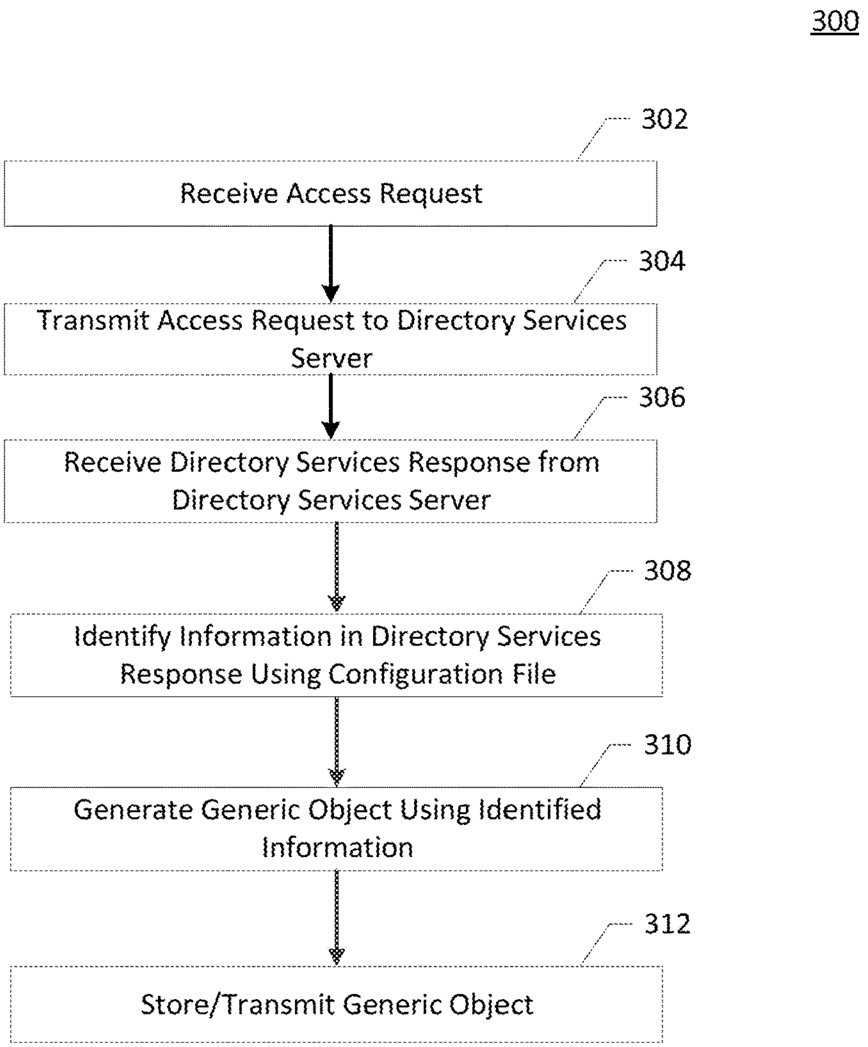
Figure 4:
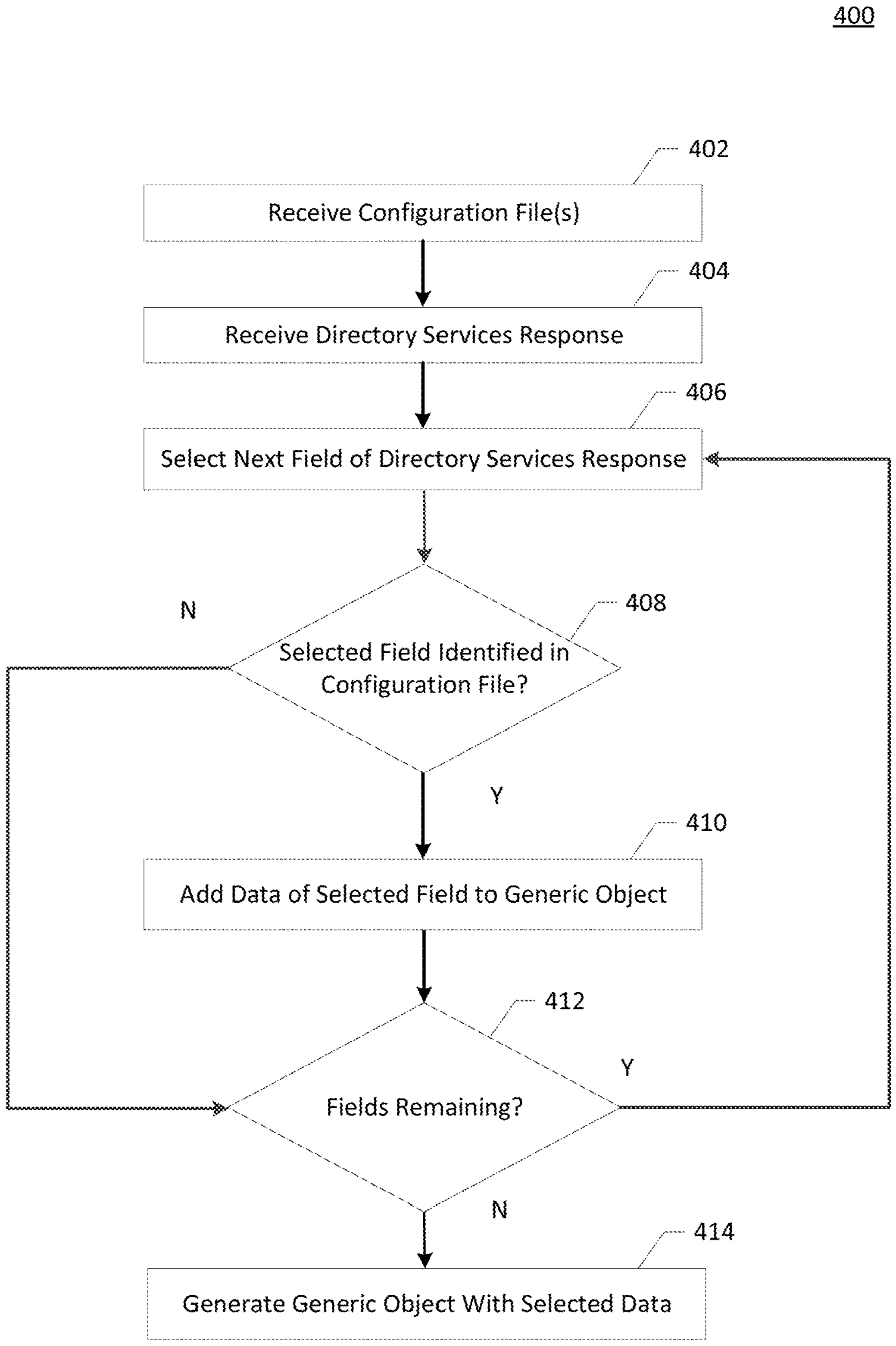

Having thus described certain embodiments of the invention in general terms, reference will now be made to the accompanying drawings, which are not necessarily drawn to scale, and wherein:

FIG. 1 is a block diagram of an apparatus for providing improved directory services that may be specially configured in accordance with example embodiments of the present invention;

FIG. 2 is a block diagram of a data flow between logical components of a network implementing improved directory services in accordance with some embodiments of the present invention;

FIG. 3 is an illustration depicting a flow diagram of a process for implementing improved directory services in accordance with some embodiments of the present invention; and FIG. 4 is an illustration depicting a flow diagram of a process for translating an LDAP response into a generic data object in accordance with some embodiments of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Introduction and Definitions

A method, apparatus and computer program product are provided in accordance with example embodiments of the present invention to provide improved directory services for networked computing environments. As noted above, the inventors have identified that present systems for providing directory services are inadequate for many use cases due to tight coupling between directory services server message structures and application directory service access interfaces. To address these problems, the inventors have developed methods and systems that provide a translation layer between directory services servers and applications, such that directory services responses (e.g., Lightweight Directory Access Protocol Responses) received from servers are translated into generic data objects, such as Plain Old Java Objects (POJOs) such that the application does not need to know the particular message structure employed by the directory services server.

Furthermore, the inventors have recognized that the use of a configurable translator allows for changes and additions to the structure of the directory services response without the need to change the interface within the application. To this end, the translator may access one or more configuration files to identify fields and values within the directory services response for inclusion in the generic data object provided to the application. In the event new fields or values are configured on the directory services server, the configuration file may be updated to add those additional values to the generic data object generated by the translator application.

The inventors have also recognized that the use of an intermediate translation layer may also allow for allowing different applications to interact with the directory services response in different ways. For example, different applications may be concerned with different fields of the directory services response, such that different generic data objects are output depending upon which application makes the request to the directory services server.

As a result of utilizing embodiments of the present invention, applications requesting information from a directory services server do not require an understanding of the structure and contents of the directory services response. This provides the benefit of a streamlined implementation of such directory services systems with these applications, as developers merely need to configure their software to receive standard generic data objects, such as POJOs. Embodiments further provide the technical benefit of simpler data access by eliminating the need to implement parsing of the directory services response within the application itself, and by implementing a reduced representation of the directory services response (e.g., only selecting a subset of available fields), the application may access particular data fields which are relevant to its processing while discarding irrelevant fields, thereby improving performance and reducing the required memory footprint.

For the purposes of this disclosure, the term "directory services" refers to a network implementation of a protocol for accessing and maintaining distributed directory information services over a network. The use of this term further contemplates such directory services that, while conforming to a particular standard, such as the Lightweight Directory Access Protocol (LDAP) standard, particular response messages may contain a variety of data fields and data values that differ across implementations of the standard. For the purposes of this application then, the term "directory services" should be understood to cover networks implementing the LDAP standard and other equivalent standards such that said equivalent standards would function in a similar manner when used with embodiments of the invention as described herein. The term "directory services server" refers to a server module, apparatus, or application that is capable of providing directory services as described herein. For example, as contemplated by this application, an LDAP server would be a "directory services server." It should also be appreciated that while many of the instant embodiments are described with particular reference to the LDAP standard, various alternative embodiments may utilize different standards or other directory services interfaces having similar structural or functional characteristics.

For the purposes of this disclosure, the term "directory services response" refers to a response received from a directory services server after a successful validation, such as in response to a username and password being accepted by the directory services server.

For the purposes of this disclosure, the term "generic data object" refers to a data structure that includes a set of values and methods for accessing those values. For example, embodiments may employ the use of POJOs as generic data objects.

Exemplary Client Apparatus

FIG. 1 illustrates a block diagram of an apparatus 100 in accordance with some example embodiments. The apparatus 100 may be any computing device capable of implementing an interface with a directory services server and providing translation functions for directory services responses as described herein. For example, the apparatus 100 may be implemented as a client device implementing an application that requests directory services information from a central directory services server, such as an LDAP server. The apparatus 100 may execute login functionality to verify a user's credentials (e.g., user name and password) and receive a set of directory services information (e.g., single sign-on information, lists of subscribers, email addresses, network configuration information for that user, or the like). The apparatus 100 also implements a translation layer that serves to generate a generic data object from the directory services response to streamline the interaction between the application that executed the directory services request and the directory services server.

In some embodiments, such as where the apparatus is a client device, the apparatus 100 may include a display and input devices (e.g., mice, keyboards, touch screens, etc.) for providing an interface (e.g., a login screen, application window, or the like), while in other embodiments, such as where the apparatus 100 is an intermediate device, the apparatus 100 may function as an intermediate server providing the graphical user interface to another apparatus which in turn functions as a client device (e.g., where the apparatus provides remote access capabilities such as over a network). It should be appreciated that embodiments include scenarios both where the apparatus functions to generate a directory services request for a locally executing application (e.g., where the apparatus is a client device) or a remotely executing application (e.g., where the apparatus is an intermediate device), and while the apparatus is generally described as locally executing the application that initiated the directory services request, embodiments may also include scenarios where the application is executed external to the apparatus 100.

The apparatus 100 may be implemented as a standalone or rack-mounted server, a desktop computer, a laptop computer, a personal digital assistant, a tablet computer, a netbook computer, a mobile device, or the like. Accordingly, it will be appreciated that the apparatus 100 may comprise devices, hardware, and the like configured to implement and/or otherwise support implementation of various example embodiments described herein.

It should be noted that the components, devices or elements illustrated in and described with respect to FIG. 1 below may not be mandatory and thus some may be omitted in certain embodiments. Additionally, some embodiments may include further or different components, devices or elements beyond those illustrated in and described with respect to FIG. 1.

As illustrated in FIG. 1, an apparatus 100 may include a processor 102, a memory 104, input/output circuitry 106, communications circuitry 108, LDAP interface circuitry 110, LDAP translator circuitry 112, and generic object consumption circuitry 114. The apparatus 100 may be configured to execute the operations described below with respect to FIGS. 2-4. Although these components 102-114 are described with respect to functional limitations, it should be understood that the particular implementations necessarily include the use of particular hardware. It should also be understood that certain of these components 102-114 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, "circuitry" includes processing circuitry, storage media, network interfaces, input/output devices, and/or the like. In some embodiments, other elements of the apparatus 100 may provide or supplement the functionality of particular circuitry. For example, the processor 102 may provide processing functionality, the memory 104 may provide storage functionality, the communications circuitry 108 may provide network interface functionality, and the like, such that each of the circuitries may be formed by other circuitry components of the apparatus 100.

In some embodiments, the processor 102 (and/or co-processor or any other processing circuitry assisting or otherwise associated with the processor) may be in communication with the memory 104 via a bus for passing information among components of the apparatus. The memory 104 may be non-transitory and may include, for example, one or more volatile and/or non-volatile memories. In other words, for example, the memory may be an electronic storage device (e.g., a computer readable storage medium). The memory 104 may be configured to store information, data, content, applications, instructions, tables, data structures, or the like, for enabling the apparatus to carry out various functions in accordance with example embodiments of the present invention.

The processor 102 may include various processing devices and may, for example, include one or more processing devices configured to perform independently from one another. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 102 may be configured to execute instructions stored in the memory 104 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, and the instructions may specifically configure the processor to perform the algorithms and/or operations described herein when the instructions are executed.

In some embodiments, the apparatus 100 may include input/output circuitry 106 that may, in turn, be in communication with processor 102 to provide output to the user and, in some embodiments, to receive an indication of a user input. The input/output circuitry 106 may comprise a user interface and may include a display and may comprise a web user interface, a mobile application, a client device, a kiosk, or the like. In some embodiments, the input/output circuitry 106 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 104, and/or the like).

The communications circuitry 108 may be any means such as a device or circuitry embodied in either hardware or a combination of hardware and software that is configured to receive and/or transmit data from/to a network and/or any other device, circuitry, or module in communication with the apparatus 100. In this regard, the communications circuitry 108 may include, for example, a network interface for enabling communications with a wired or wireless communication network. For example, the communications circuitry 108 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The LDAP interface circuitry 110 includes hardware configured to interact with an LDAP server to perform directory services operations, such as transmission of user credentials to the LDAP server and receiving of a directory services response from the LDAP server. The LDAP interface circuitry 110 utilizes network interface hardware, such as the communications circuitry 108, to transmit the user credentials to the directory services server and to receive a directory services response from the directory services server in response to the directory services server validating the user credentials. The LDAP interface circuitry 110 may interact with the generic object consumption circuitry 114 such that the generic object consumption circuitry 114 provides an application interface or interfaces including a login screen. In some embodiments, a framework, such as Spring Security, may facilitate the interaction between the generic object consumption circuitry and the LDAP interface circuitry 110. An LDAP response received by the LDAP interface circuitry 110 may be transmitted to the LDAP translator circuitry 112 via a shared memory, bus, application programming interface (API) call, or other mechanism for transmission of such data. The LDAP response may be provided to the LDAP translator circuitry 112 in the same format or structure as the LDAP response was provided by the directory services server. An example of a data interaction between a directory services server and an embodiment of an LDAP interface is described further below with respect to FIG. 2.

The LDAP translator circuitry 112 includes hardware configured to translate an LDAP response received from an LDAP server via the LDAP interface circuitry 110 to generate a generic data object (e.g., a POJO) from the LDAP response. The LDAP translator circuitry 112 may receive the LDAP response from the LDAP interface circuitry 110 via a message bus, shared memory, API call, or the like implemented on hardware, such as the processor 102. The LDAP response is received by the LDAP translator circuitry 112 in the same format or structure as it was transmitted by the directory services server. The LDAP translator circuitry 112 generates a generic data object in a format suitable for consumption by the generic object consumption circuitry 114, extracting one or more data values from the LDAP response according to the configuration of the LDAP translator circuitry 112. The LDAP translator circuitry 112 may be configured by one or more configuration files which identify particular fields of the LDAP response for extraction and storage in the generic data object. The LDAP translator circuitry 112 may implement particular methods and functions for such generation of data objects, including functionality for instantiating such objects, allocating memory, and interacting with those objects (e.g., getter and setter functions, and other methods associated with the generic data objects). An example of a data flow for generating a generic data object from an LDAP response using an LDAP translator is described further below with respect to FIG. 2. A specific embodiment of a method for translating an LDAP response to generate a generic data object is described further below with respect to FIG. 4.

The generic object consumption circuitry 114 includes hardware configured to receive, store, utilize, or otherwise consume a generic data object generated by the LDAP translator circuitry 112 to include one or more data values received in an LDAP response received by the LDAP interface circuitry 110. The generic object consumption circuitry 114 may include, for example, an application configured to provide a login interface and to receive directory services information in response to a successful login operation. Rather than receive and parse an LDAP response resulting from such an interaction, the generic object consumption circuitry 114 instead receives the generic data object in a format that includes methods and functions for accessing the relevant data included in the generic data object by the LDAP translator circuitry 112. Such an implementation advantageously reduces the amount of data received by the generic object consumption circuitry and provides an efficient, flexible interface for accessing that data. This implementation also eliminates the need for the application or applications that wish to receive the LDAP response to include functions or other code to parse the structure of the LDAP response or communicate directly with the LDAP server. The generic object consumption circuitry 114 may, in some embodiments, include a database for storing the resulting generic data objects produced by the LDAP translator circuitry 112 for later use, while in other embodiments the generic data objects may be used immediately to obtain needed directory services data. The generic object consumption circuitry 114 may include processing hardware, such as the processor 102, and storage capability, such as the memory 104 to perform these and other functions related to utilizing the generic data object that includes the directory services data. It should be appreciated that the various uses of this data may include network configuration, performing of a "single sign-on" such that the application is provided with credentials to access multiple remote systems, or various other uses in conformance with the manner in which LDAP responses are otherwise implemented, without the functions and methods for parsing those LDAP responses being implemented within the generic object consumption circuitry 114 or attendant applications themselves.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

As described above and as will be appreciated based on this disclosure, embodiments of the present invention may be configured as methods, mobile devices, backend network devices, and the like. Accordingly, embodiments may comprise various means including entirely hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Having now described an apparatus configured to implement and/or support implementation of various example embodiments, features of several example embodiments will now be described. It will be appreciated that the following features are non-limiting examples of features provided by some example embodiments. Further, it will be appreciated that embodiments are contemplated within the scope of disclosure that implement various subsets or combinations of the features further described herein. Accordingly, it will be appreciated that some example embodiments may omit one or more of the following features and/or implement variations of one or more of the following features.

Examples of Improved Directory Services Data Flows

The following data flows describe example system interactions for providing improved directory services in accordance with embodiments of the present invention. The data flows illustrate interactions among system components to facilitate contacting a directory services server (e.g., an LDAP server), receiving a response, translating the response using a configurable translator to generate a generic data object, and providing the generic data object to an application that initiated the contact with the directory services server.

In the particular example illustrated in FIG. 2, a client 202 is in communication with an LDAP server 204. The client 202 may be an apparatus as described above with respect to FIG. 1, such that the client includes hardware configured to execute the directory services access operations described herein. The client 202 includes an application 206 in communication with an LDAP interface 208 and an LDAP translator 210. The application 206 may be implemented by or in conjunction with generic object consumption circuitry 214 as described above with respect to FIG. 1, the LDAP interface 208 may be implemented by or in conjunction with LDAP interface circuitry 110 as described above with respect to FIG. 1, and the LDAP translator 210 may be implemented by the LDAP translator circuitry 112 described above with respect to FIG. 1.

The application 206 may include any type of application that is operable to generate an access request to an LDAP server, such as the LDAP server 204. For example, the application 206 may include an authentication or security component that provides a user name and password to the LDAP server 204, and in response receives directory services information from the LDAP server 204. As described above, embodiments of the present invention advantageously allow for improved applications that do not need to directly implement an LDAP interface for receiving and parsing an LDAP response, as such parsing and translation functions are handled by the LDAP translator 210.

In the example data flow 200, the application initiates an access request to the LDAP server 204. This access request may, as noted above, include providing login credentials. The access request may be received via the LDAP interface 208, and the LDAP interface may facilitate transmission of the access request to the LDAP server 204 as an LDAP request. In response to the LDAP request, the LDAP server 204 may validate the LDAP request (e.g., verify the login credentials), and generate an LDAP response for transmission back to the LDAP interface 208. The LDAP response may be received by the LDAP interface 208. After the LDAP interface 208 receives the LDAP response, the LDAP response may be sent directly to the LDAP translator 210 (as pictured), or returned to the application 206. In embodiments where the LDAP response is returned to the application, the application 206 subsequently forwards the LDAP response to the LDAP translator 210 (not shown).

The LDAP translator 210 facilitates translation of the LDAP response into a generic data object. As described above, the structure and contents of the LDAP response vary depending upon the particular implementation of the LDAP server 204, such that, in order to extract meaningful data from the LDAP response, the application would need to implement a specific method for parsing the LDAP response. Instead, embodiments implement the LDAP translator 210 to translate the LDAP response into a format suitable for consumption by the application. An example LDAP response for a fictional user "abc123xy" may be presented as follows:

TABLE 1

<abc123xy>: msexchwhenmailboxcreated=20120922115115.0Z
<abc123xy>: mapirecipient=TRUE
<abc123xy>: usncreated=326217
<abc123xy>: badpwdcount=0
<abc123xy>: managerdisplayname=Bob, Billy
<abc123xy>: givenname=John
<abc123xy>: objectsid=?a&?e?n?m??
<abc123xy>: msexchuserculture=en-US
<abc123xy>: msexchuseraccountcontrol=0
<abc123xy>: mck-segment2=MTX - CCQ
<abc123xy>: msexchmailboxsecuritydescriptor=?0L!\“Pao?0E?V!\”Pa5?0E?V
<abc123xy>: mck-segment1=CCQ
<abc123xy>: samaccounttype=805306368
<abc123xy>: pwdlastset=130824898335780550
<abc123xy>: msexchpoliciesexcluded={26491CFC-9E50-4857-861B-0CB8DF22B5D7}
<abc123xy>: msexchumdtmfmap=reversedPhone:8927348972
<abc123xy>: msrtcsip-primaryhomeserver=CN=LC Services,CN=Microsoft,CN=im02,CN=Pools,CN=RTC Service,CN=Services,CN=Configuration,DC=corp,DC=mckesson,DC=com
<abc123xy>: msexchversion=44220983382016
<abc123xy>: usnchanged=44115117
<abc123xy>: legacyexchangedn=/o=McKesson/ou=North America/cn=Recipients/cn=abc123xy
<abc123xy>: ismanager=FALSE
<abc123xy>: msexchtextmessagingstate=302120705
<abc123xy>: homemdb=CN=ndhdag02db6,CN=Databases,CN=Exchange Administrative Group (FYDIBOHF23SPDLT), CN=Administrative Groups,CN=McKesson,CN=Microsoft Exchange,CN=Services, CN=Configuration,DC=corp,DC=mckesson,DC=com
<abc123xy>: primarygroupid=513
<abc123xy>: officecode=C272
<abc123xy>: instancetype=4
<abc123xy>: streetaddress=5673 Blue Ridge Drive Suite 999
<abc123xy>: mck-companycode=65T
<abc123xy>: whencreated=20071001190447.0Z
<abc123xy>: dscorepropagationdata=20150811021708.0Z
<abc123xy>: sn=Smith
<abc123xy>: costcenter=01710318
<abc123xy>: st=GA
<abc123xy>: manager=CN=def342rur,OU=employees,DC=na,DC=corp,DC=mckesson,DC=com
<abc123xy>: mck-jobfunction=SYS
<abc123xy>: msexchrecipienttypedetails=1
<abc123xy>: cn=abc123xy
<abc123xy>: lockouttime=0
<abc123xy>: co=USA
<abc123xy>: l=Atlanta
<abc123xy>: samaccountname=abc123xy
<abc123xy>: showinaddressbook=CN=Default Global Address List,CN=All Global Address Lists, CN=Address Lists Container,CN=McKesson,CN=Microsoft Exchange, CN=Services,CN=Configuration,DC=corp,DC=mckesson,DC=com
<abc123xy>: displayname=Smith, John
<abc123xy>: homemta=CN=Microsoft MTA,CN=NDHEP50004,CN=Servers, CN=Exchange Administrative Group (FYDIBOHF23SPDLT),CN=Administrative Groups, CN=McKesson,CN=Microsoft Exchange,CN=Services,CN=Configuration,DC=corp,DC=mckesson,DC=com
<abc123xy>: protocolsettings=MAPI?????1???
<abc123xy>: badpasswordtime=130867297775837283
<abc123xy>: mail=John.Smith@Tech.com
<abc123xy>: telephonenumber=345-857-8542
<abc123xy>: msrtcsip-optionflags=257
<abc123xy>: proxyaddresses=x500:/o=ExchangeLabs/ou=Exchange Administrative Group (FYDIBOHF23SPDLT)/cn=Recipients/cn=eb2a09ae725e4d73a2a2459e7881451f-abc123xy
<abc123xy>: countrycode=0
<abc123xy>: objectclass=top
<abc123xy>: hiredate=2007-10-08
<abc123xy>: manageremail=Billy.Bob@Tech.com
<abc123xy>: pager=N/A
<abc123xy>: msrtcsip-primaryuseraddress=sip:John.Smith@Tech.com
<abc123xy>: msrtcsip-internetaccessenabled=TRUE
<abc123xy>: useraccountcontrol=513
<abc123xy>: msexchrbacpolicylink=CN=Default Role Assignment Policy,CN=Policies,CN=RBAC,CN=McKesson,CN=Microsoft Exchange,CN=Services,CN=Configuration,DC=corp,DC=mckesson,DC=com
<abc123xy>: mailnickname=abc123xy
<abc123xy>: initials=X
<abc123xy>: extensionattribute2=e470rur
<abc123xy>: msexchmailboxguid=??kr??K?=4???bl
<abc123xy>: codepage=0
<abc123xy>: userprincipalname=abc123xy@na.corp.mckesson.com
<abc123xy>: msexchalobjectversion=873
<abc123xy>: name=abc123xy TABLE 1-continued

| |
|---|
| <abc123xy>: textencodedoraddress=X400:C=US;A= ;P=McKesson;O=Exchange;S=Smith;G=John;I=P; |
| <abc123xy>: objectcategory=CN=Person,CN=Schema,CN=Configuration,DC=corp,DC=mckesson,DC=com |
| <abc123xy>: memberof=CN=ADLtest34-5,OU=SmartGroups,OU=Groups, OU=EDS,OU=Delegated,DC=na,DC=corp,DC=mckesson,DC=com |
| <abc123xy>: logoncount=34 |
| <abc123xy>: departmentnumber=V94095 |
| <abc123xy>: msexchsafesendershash=p? |
| <abc123xy>: msrtcsip-archivingenabled=0 |
| <abc123xy>: msexchhomeservername=/o=McKesson/ou=Exchange Administrative Group (FYDIBOHF23SPDLT) /cn=Configuration/cn=Servers/cn=NDHEP50004 |
| <abc123xy>: employeenumber=45671 |
| <abc123xy>: mdbusedefaults=TRUE |
| <abc123xy>: mck-rawtelephonenumber=3458578542 |
| <abc123xy>: whenchanged=20151008142509.0Z |
| <abc123xy>: title=Sr. Software Engineer |
| <abc123xy>: postalcode=56412<abc123xy>: objectguid=L???s?O? |
| <abc123xy>: physicaldeliveryofficename=Somewhere - Tech Atlanta |
| <abc123xy>: company=Connected Care |
| <abc123xy>: msexchhidefromaddresslists=FALSE |
| <abc123xy>: department=Some Department |
| <abc123xy>: empstatus=A |
| <abc123xy>: lastlogontimestamp=130887879091058544 |
| <abc123xy>: employeetype=E |
| <abc123xy>: terminationdate=N/A |
| <abc123xy>: facsimiletelephonenumber=N/A |
| <abc123xy>: mobile=N/A |
| <abc123xy>: msrtcsip-federationenabled=TRUE |
| <abc123xy>: msexchrecipientdisplaytype=1073741824 |
| <abc123xy>: accountexpires=0 |
| <abc123xy>: msrtcsip-userenabled=TRUE |
| <abc123xy>: lastlogon=130871841388540680 |
| <abc123xy>: distinguishedname=CN=abc123xy,OU=employees,DC=na,DC=corp,DC=mckesson,DC=com |
| <abc123xy>: msexchsaferecipientshash=p? |

While the LDAP response may define particular fields and corresponding values for the particular user, the exact structure of such an LDAP response often varies from one LDAP server to another.

The LDAP translator 210 may be configured in this process by a translator configuration file 212. The translator configuration file 212 may include a definition of the generic data object 214 output by the LDAP translator 210, and a set of rules for identifying relevant data fields of the LDAP response and extracting the content associated with those relevant fields for inclusion in the generic data object 214.

For example, a translator configuration file 212 may define the generic data object as follows:

TABLE 2

```
@Document
class User extends Model {
String firstName
String lastName
String hireDate
Set<Role> roles
String userId
String passwd
String email
String title
String department
String empId
...
}
```

This data object may include each of the fields that is relevant to the particular application 206. In some embodiments, different applications may be associated with different object definitions, such that each application only receives data that is relevant to that particular application. In other embodiments, the generic data object 214 may be defined in a single manner, with each field that is deemed to be relevant to any particular application that may initiate an access request. In the present example, the generic data object includes fields for a user's first name, last name, date of hire, particular access roles, a user ID, a password, an email address, a title, a department, an employee ID, and the like.

The translator configuration file 212 also includes a set of rules for reviewing the LDAP response and populating the generic data object with data from the LDAP response. For example, a set of rules included in a translator configuration file 212 for extracting the data referenced in Table 2 from the LDAP response referenced in Table 1 might be as follows:

TABLE 3

```
# name value pairs
- { type: LDAP, name: firstName, value: givenname, __class:
NameValue }
- { type: LDAP, name: lastName, value: sn, __class: NameValue }
- { type: LDAP, name: email, value: mail, __class: NameValue }
- { type: LDAP, name: title, value: title, __class: NameValue }
- { type: LDAP, name: department, value: department, __class:
NameValue }
- { type: LDAP, name: hireDate, value: hiredate, parm: 'yyyy-MM-dd',
__class: NameValue }
- { type: LDAP, name: empId, value: employeenumber, __class:
NameValue }
- { type: LDAP__ROLE, name: \#MDL*, value: USER, parm: 'CN',
__class: NameValue }
- { type: LDAP__ROLE, name: \#MDL PRR*, value: ADMIN, parm:
'CN', __class: NameValue }
```

As depicted in Table 3, the configuration file may represent the rules for translating the LDAP response in a markup language, such as Yet Another Markup Language (YAML).

Types, value pairs, and formatting for data values may be represented through particular markup tags, and the translator may parse this markup language to configure the translation process. As noted in Table 3, some fields may also include parameters used for formatting those fields. For example, the "hireDate" field includes a parameter for formatting an associated date, "yyy-MM-dd". It should be appreciated that different types of data fields may be associated with different types of parameters. For example, the "USER" and "ADMIN" values use a "common name" parameter as indicated by the "CN" parameter.

In some embodiments, the generic data object is populated with the information from the LDAP response through a process known as "Java Reflection." The process of Java Reflection enables the mapping process to occur at runtime to populate the generic data object with data from the LDAP response in a flexible, efficient manner.

Upon receiving the LDAP response, the LDAP translator 210 may iterate through the fields of the LDAP response to determine which fields are identified within the translator configuration file 212 as relevant to the generic data object being created for consumption by the application 206. As each field is encountered within the LDAP response, the corresponding data value is used to populate the corresponding values of the generic data object.

It should be appreciated that fields of the generic data object and the LDAP response may not have a one to one correlation. For example, the LDAP response may use a single field to define the user's name, "John Doe," while the generic data object may have separate data fields for the user's first name and last name. The translator configuration file 212 may include rules for parsing such occurrences to merge or separate data fields as appropriate when generating the generic data object.

After generating the generic data object 214, the generic data object 214 is provided to the application. In some embodiments, providing the generic data object 214 to the application includes storing the generic data object in a database or other local memory where it is accessible to the application (e.g., via a function call executed after receiving a notification of the success of the access request and/or translation operation), while in other embodiments the generic data object 214 is transmitted to the application directly (e.g., via a shared memory, bus, or the like). The application 206 may subsequently access the data stored within the generic data object 214 via methods associated with the generic data object 214, as typically utilized in object-oriented paradigms.

Exemplary Processes for Implementing an Improved Directory Services Interface FIGS. 3-4 are flow diagrams depicting example processes for implementing an improved directory services interface in accordance with embodiments of the present invention. These processes may be employed by an apparatus, such as the apparatus 100 described above, to perform tasks related to creation of an access request from an application, receipt of an LDAP response from an LDAP server, translation of the LDAP response into a generic data object, and provision of the generic data object to an application. In this regard, these processes describe algorithms that are implemented via hardware or software executing on hardware components of an apparatus to implement these tasks and other tasks related to implementation of a directory services system. These algorithms may serve as means for implementing these tasks and other functions as described above and herein.

FIG. 3 depicts an example of a process 300 for processing an access request made to a directory services server (e.g., an LDAP server), receiving an LDAP response, and generating a generic data object from the LDAP response. The process 300 may be performed, for example, by an LDAP interface 208 and/or LDAP interface circuitry 110 as described with respect to FIGS. 2 and 1, respectively. The process 300 therefore illustrates a mechanism by which different components of a client system interact to provide a requesting application or other generic object consumer with a generic object comprising data derived from an LDAP response.

At action 302, an access request is received. As described above, the access request may include user account credentials, an identifier of a directory services server, and/or any other data necessary to request access to a set of directory services information from such a server. The access request may be generated, for example, by an application executing on a client. The access request may be related to a user account sign-on operation (e.g., access to a single system or service), a "single sign-on" operation whereby access is provided to multiple systems or services through a single access request, a request for a directory of users or addresses, or any other type of access request related to a request for directory services information from a directory services server.

At action 304, the access request is transmitted to the directory services server. For example, the access request may be processed and formatted according to a particular standard, such as the LDAP standard, and transmitted to the directory services server via a network interface. At action 306, a response is received from the directory services server, including information encoded in a particular format associated with that directory services server. The response may be generated by the directory services server in response to validating the user credentials or other information included in the access request. As noted above, the directory services response received from the directory services server may have a structure and contents that are unique to the particular implementation of the directory services server. To facilitate access to the data included in the response, the directory services response is translated into a generic data object.

At action 308, particular data fields and other information within the directory services response are identified based on information stored within a configuration file. For example, the directory services response may be provided to a translator that is configurable by a configuration file that identifies particular fields of the directory services response and rules for translating those fields into a generic data object. At action 310, those identified fields are used to generate the generic data object. An example of a process for identifying fields of the directory services response and generating the generic data object using those identified fields is described further with respect to FIG. 4.

At action 312, the generic data object is stored and/or transmitted for use by the application that initiated the access request. As noted above, the generic data object may be provided directly to the application, or stored in a memory for accessing by the application at a later time. The generic data object may then be accessed by the calling application to obtain data relevant to that application for use in various functionality associated with directory services applications (e.g., identifying single sign-on information, identifying user/network configuration settings, identifying other user addresses, or the like).

FIG. 4 depicts an example of a process 400 for translating a directory services response into a generic data object in accordance with embodiments of the present invention. As described above, embodiments employ a translator to facilitate the generation of such generic data objects, and the process 400 illustrates one embodiment whereby the translator is configurable to select particular data fields and values from a directory services response, and generate a generic data object using those selected data fields and values. The configuration of the translator is performed through the use of a configuration file or files which define the generic data object and identify the particular fields of the directory services response for inclusion in the generic data object. By using a configurable translator in this manner, the translator can be updated to reflect changes to the generic data object and/or directory services response through editing of the configuration file, rather than requiring recompilation of application source code to reflect the changes.

At action 402, a configuration file or files is received. As noted above, in some embodiments multiple configuration files may be employed to represent different translation processes for different types of directory services responses. For example, if the translator supports requests made to two different directory services servers with different configurations (e.g., different data fields implemented by two different LDAP servers), then the particular configuration file chosen for use in translation may be keyed to the particular server address or directory services response type. As described above, the configuration file may include a definition of the generic data object to be output and a set of rules for identifying fields of the directory services response and converting the data values of those fields into elements of the generic data object.

At action 404, the directory services response (e.g., an LDAP response) is received. As described above, the directory services response may be received in response to validation of user credentials included in an access request transmitted to the directory services server.

At action 406, a field of the directory services response is selected. Selection of a field may be performed by tokenizing the directory services response (e.g., dividing the response up by the presence of particular characters or the like), each line of the directory services response may be understood to represent a different field, or various other techniques. In some embodiments, the LDAP response may be parsed using a particular library or external function. For example, some embodiments may employ the "Spring LDAP" library provided as a component of the "Spring Security" framework to parse through the directory entries, while other embodiments may utilize other parsing functions or processes to parse the LDAP response. After parsing the LDAP response, the particular fields identified in the configuration file may be searched for in the resulting parsed response. The parsed LDAP response may include definitions of fields and values included within the LDAP response, as the parsing process may separate fields and values from one another.

At action 408, a determination is made as to whether the selected field is identified in the configuration file as a component of the generic data object. If the field is identified in the configuration file, the process proceeds to action 410. Otherwise, the process proceeds to action 412.

At action 410, the process uses the rule associated with the particular data field to format the value of the field into the generic data object. As described above with respect to Table 3, the configuration file includes a rule or instructions for parsing the particular field and storing the attendant data in the generic data object. After storing the data in the generic data object, the process proceeds to action 412.

At action 412, a determination is made as to whether any data fields remain in the directory services response. If fields remain, the process returns to action 406 to select the next field, such that all fields of the directory services response are evaluated for inclusion in the generic data object. If no fields remain, the process proceeds to action 414.

At action 414, the process completes generation of the generic data object using the data identified when iterating through each field. Generation of the generic data object may include, for example, transmitting the generic data object and/or a memory location storing that generic data object to an application, or storing the generic data object in a database. It should also be appreciated that embodiments of the process 400 may also include initializing the generic data object with default values prior to reviewing the directory services response, such that the generic data object is initially generated, and then later populated with the data parsed from the directory services response.

It will be understood that each element of the flowcharts, and combinations of elements in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 104 of an apparatus employing an embodiment of the present invention and executed by a processor 102 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for implementing directory services in a computer network, the method comprising:

transmitting an access request to a directory services server, the access request comprising user credentials;

receiving, in response to validation of the user credentials by the directory services server, a directory services response from the directory services server, the directory services response comprising one or more fields of directory services data generated by the directory services server;

identifying one or more values derived from the one or more fields of the directory service data included in the directory services response based on the identifiers for one or more fields of directory service data;

translating the directory services response on client side;

receiving one or more configuration files, the one or more configuration files comprising a class definition of a Plain Old Java Object, the identifiers for one or more fields of directory service data, and one or more rules for formatting the one or more fields of the directory service data for storage in the Plain Old Java Object;

wherein said translating the directory services response comprises formatting the identified one or more values for storage in the Plain Old Java Object based on the one or more rules;

generating, based at least on the class definition of the Plain Old Java Object, wherein the Plain Old Java Object comprises the one or more values derived from the one or more fields of directory service data included in the directory services response; and providing the Plain Old Java Object to an application.

2. The method of claim 1, wherein the application also generates the access request.

3. The method of claim 1, wherein the directory services server is implemented according to the Lightweight Directory Access Protocol (LDAP) standard and wherein the directory services response is an LDAP response.

4. The method of claim 1, wherein the configuration file comprises values encoded in a Yet Another Markup Language (YAML) format.

5. The method of claim 1, further comprising storing the Plain Old Java Object in a database.

6. The method of claim 1, wherein at least one field of the directory services response is not included in the Plain Old Java Object.

7. An apparatus for implementing directory services in a computer network, the apparatus comprising a processor coupled to a memory, wherein instructions stored within the memory configure the processor to at least:

transmit an access request to a directory services server, the access request comprising user credentials;

receive, in response to validation of the user credentials by the directory services server, a directory services response from the directory services server, the directory services response comprising one or more fields of directory services data generated by the directory services server;

identify one or more values derived from the one or more fields of the directory service data included in the directory services response based on the identifiers for the one or more fields of directory service data;

translate the directory services response on client side;

receive one or more configuration files, the one or more configuration files comprising a class definition of a Plain Old Java Object, the identifiers for one or more fields of directory service data, and one or more rules for formatting the one or more fields of the directory service data for storage in the Plain Old Java Object;

wherein said translating the directory services response comprises formatting the identified one or more values for storage in the Plain Old Java Object based on the one or more rules;

generate, based at least on the class definition of the Plain Old Java Object, wherein the Plain Old Java Object comprises the one or more values derived from the one or more fields of directory service data included in the directory services response; and provide the Plain Old Java Object to an application.

8. The apparatus of claim 7, wherein the application also generates the access request.

9. The apparatus of claim 7, wherein the directory services server is implemented according to the Lightweight Directory Access Protocol (LDAP) standard and wherein the directory services response is an LDAP response.

10. The apparatus of claim 7, wherein the configuration file comprises values encoded in a Yet Another Markup Language (YAML) format.

11. The apparatus of claim 7, wherein the processor is further configured to store the Plain Old Java Object in a database.

12. The apparatus of claim 7, wherein at least one field of the directory services response is not included in the Plain Old Java Object.

13. A non-transitory computer readable storage medium comprising instructions that, when executed by a processor, cause the processor to implement directory services in a computer network by at least:

transmitting an access request to a directory services server, the access request comprising user credentials;

receiving, in response to validation of the user credentials by the directory services server, a directory services response from the directory services server, the directory services response comprising one or more fields of directory services data generated by the directory services server;

identifying one or more values derived from the one or more fields of the directory service data included in the directory services response based on the identifiers for one or more fields of directory service data;

translating the directory services response on client side;

receiving one or more configuration files, the one or more configuration files comprising a class definition of a Plain Old Java Object, the identifiers for one or more fields of directory service data, and one or more rules for formatting the one or more fields of the directory service data for storage in the Plain Old Java Object;

wherein said translating the directory services response comprises formatting the identified one or more values for storage in the Plain Old Java Object based on the one or more rules;

generating, based at least on the class definition of the Plain Old Java Object, wherein the Plain Old Java Object comprises the one or more values derived from the one or more fields of directory service data included in the directory services response; and providing the Plain Old Java Object to an application.

14. The non-transitory computer readable storage medium of claim 13, wherein the application also generates the access request.

15. The non-transitory computer readable storage medium of claim 13, wherein the directory services server is implemented according to the Lightweight Directory Access Protocol (LDAP) standard and wherein the directory services response is an LDAP response.

16. The method of claim 1, wherein the Plain Old Java Object is generated and initialized with default values prior to translating the directory services response.

17. The method of claim 1, wherein said identifying the one or more values derived from the one or more fields of the directory services data included in the directory services response based on the identifiers for one or more fields of directory service data comprises iterating through the one or more fields of directory services data included in the directory services response to determine fields identified within the one or more configuration files.

18. The method of claim 1, wherein the one or more configuration files further comprise rules for parsing, merging, and separating one or more fields of directory service data.

19. The method of claim 1, wherein generating the Plain Old Java Object comprises populating the Plain Old Java Object with the one or more values derived from the one or more fields of directory service data included in the directory services response at runtime.

* * * * *